(12) United States Patent
Honda (10) Patent No.: US 9,280,564 B2
(45) Date of Patent: Mar. 8, 2016

(54) INFORMATION PROCESSING DEVICE, INFORMATION PROCESSING METHOD, AND NON-TRANSITORY COMPUTER-READABLE MEDIUM

(71) Applicant: FUJI XEROX CO., LTD, Minato-ku, Tokyo (JP)

(72) Inventor: Kensaku Honda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 34 days.

(21) Appl. No.: 14/266,891

(22) Filed: May 1, 2014

(65) Prior Publication Data

US 2015/0161467 A1 Jun. 11, 2015

(30) Foreign Application Priority Data

Dec. 11, 2013 (JP) ................................. 2013-256184

(51) Int. Cl.
*G06K 9/00* (2006.01)
*G06F 17/30* (2006.01)
(52) U.S. Cl.
CPC ........ *G06F 17/3028* (2013.01); *G06K 9/00228* (2013.01); *G06K 9/00771* (2013.01)
(58) Field of Classification Search
CPC . G06K 9/46; G06K 9/183; G06K 2009/4666; G06F 17/3028
USPC ......... 382/103, 263, 233, 244, 195, 273, 172, 382/149, 205, 145, 242, 274, 100, 203
See application file for complete search history.

(56) References Cited

U.S. PATENT DOCUMENTS

| 8,774,538 B2 * | 7/2014 | Nassor et al. ................. 382/233 |
| 2005/0002652 A1 * | 1/2005 | Hartung et al. ............... 386/114 |

FOREIGN PATENT DOCUMENTS

| JP | 2002-298122 A | 10/2002 |
| JP | 2001-098641 | * 11/2002 |
| JP | 2008-083961 A | 4/2008 |
| JP | 2010-015543 A | 1/2010 |

* cited by examiner

*Primary Examiner* — Sheela C Chawan
(74) *Attorney, Agent, or Firm* — Sughrue Mion, PLLC

(57) ABSTRACT

An information processing device includes a memory, a receiving unit, a decision unit, and a concealment unit. The memory stores a history of performing, on an image having an attribute, a process that conceals an area within the image. The receiving unit receives an image. The decision unit extracts from the memory a history of a process performed on an image having an attribute that matches an attribute of the received image, and on the basis of the extracted history of a process, decides a concealment area within the received image. The concealment unit conceals the concealment area decided by the decision unit.

11 Claims, 8 Drawing Sheets

| DOCUMENT ID ~310 | CAPTURE TIME ~320 | CAPTURE LOCATION ~330 | PHOTOGRAPHER ~340 | VIEWER ~350 |
|---|---|---|---|---|
|  |  |  |  |  |

| USER NAME ~410 | READ RIGHTS TO PROFILE INFORMATION ~420 |
|---|---|
| CLIENT A | CLIENT A/EMPLOYEE B/EMPLOYEE C/GROUP D |
| EMPLOYEE B | EMPLOYEE B |
| EMPLOYEE C | EMPLOYEE C/EMPLOYEE B |
| GROUP D | GROUP D/EMPLOYEE B |

| VIEWER ~510 | MASKING TARGET ~520 |
|---|---|
| CLIENT A | EMPLOYEE B, EMPLOYEE C, FACES OF MEMBERS OF GROUP D |
| EMPLOYEE B | MASK UNNECESSARY |
| EMPLOYEE C | FACE OF EMPLOYEE B |
| GROUP D | FACE OF EMPLOYEE B |

| GROUP NAME ~610 | MEMBER NAME ~620 |
|---|---|
| GROUP D | EMPLOYEE F, EMPLOYEE G, EMPLOYEE H |
| ⋮ | ⋮ |

| EXECUTING USER ~710 | TIME ~720 | LOCATION ~730 | PHOTOGRAPHER ~740 | MASKING METHOD ~750 | MASKING TARGET ~760 | VIEWER ~770 |
|---|---|---|---|---|---|---|
| User-12 | 02/01/2008 14:30 | SHIBUYA CENTER GAI | User-12 | FACE | NON-EMPLOYEE FACES | ... |
| User-14 | 05/01/2008 14:33 | CHITOSE-FUNABASHI SHOPPING AREA | User-A | FACE | ALL FACES | ... |
| User-15 | 07/01/2012 8:30 | FACTORY A | User-14 | BACKGROUND | 80% OF AREA | ... |
| User-2 | 08/01/2012 17:30 | FFXXXXX MINATO MIRAI OFFICE | User-B | TEXT | AREA ENCLOSED BY RECTANGLE | ... |

INFORMATION PROCESSING DEVICE, INFORMATION PROCESSING METHOD, AND NON-TRANSITORY COMPUTER-READABLE MEDIUM

CROSS-REFERENCE TO RELATED APPLICATIONS

This application is based on and claims priority under 35 USC 119 from Japanese Patent Application No. 2013-256184 filed Dec. 11, 2013.

BACKGROUND

Technical Field

The present invention relates to an information processing device, an information processing method, and a non-transitory computer-readable medium.

SUMMARY

According to an aspect of the invention, there is provided an information processing device that includes a memory, a receiving unit, a decision unit, and a concealment unit. The memory stores a history of performing, on an image having an attribute, a process that conceals an area within the image. The receiving unit receives an image. The decision unit extracts from the memory a history of a process performed on an image having an attribute that matches an attribute of the received image, and on the basis of the extracted history of a process, decides a concealment area within the received image. The concealment unit conceals the concealment area decided by the decision unit.

BRIEF DESCRIPTION OF THE DRAWINGS

An exemplary embodiment of the present invention will be described in detail based on the following figures, wherein.

DETAILED DESCRIPTION

Hereinafter, an exemplary embodiment related to realizing the present invention will be described by way of example on the basis of the drawings.

Figure 1:
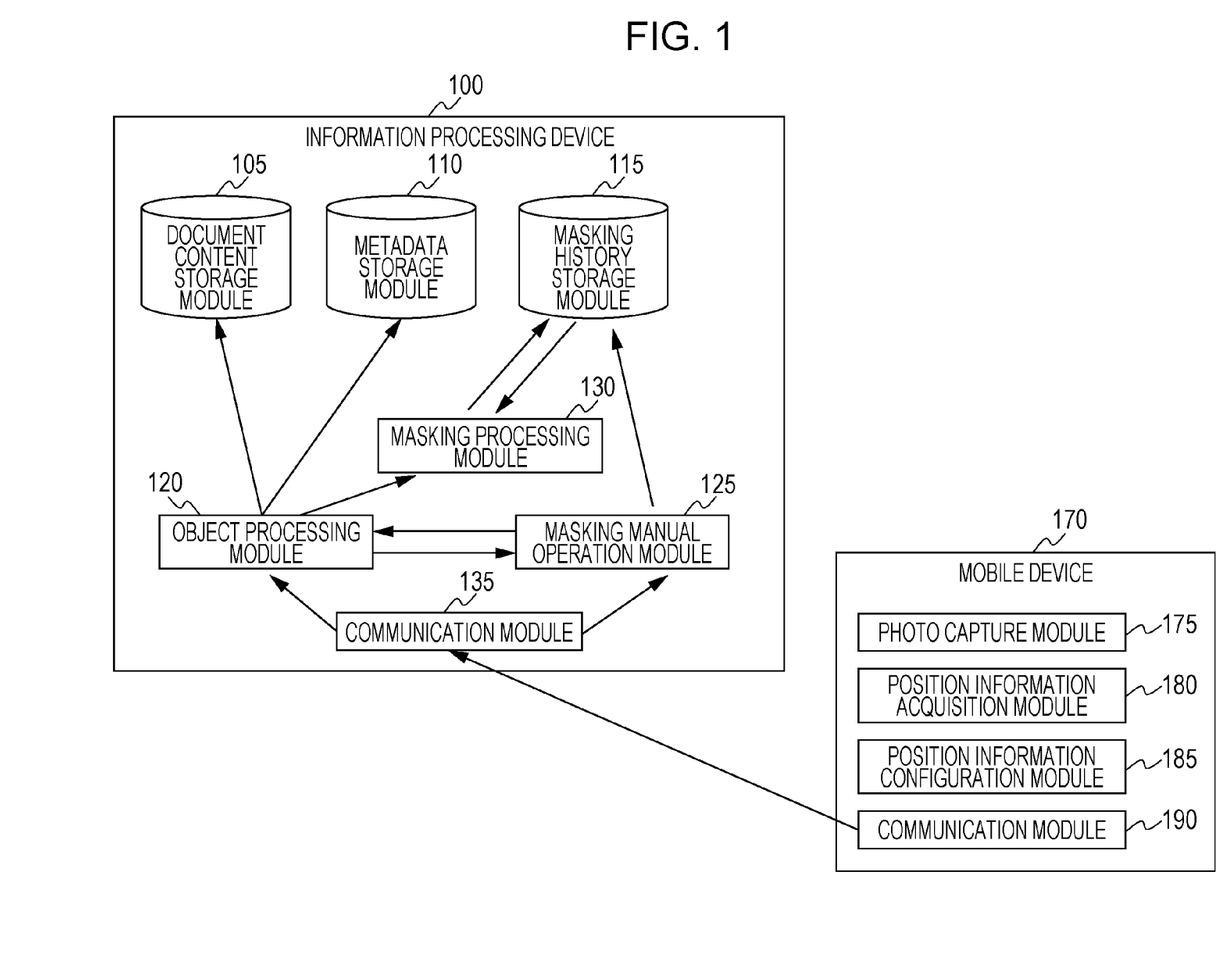
FIG. 1 is a schematic module configuration diagram for an exemplary configuration according to an exemplary embodiment.

FIG. 1 illustrates a schematic module configuration for an exemplary configuration according to the exemplary embodiment.

Note that the term module refers to components such as software (computer programs) and hardware which are typically capable of being logically separated. Consequently, the term module in the exemplary embodiment not only refers to modules in a computer program, but also to modules in a hardware configuration. Thus, the exemplary embodiment also serves as a description of a computer program (a program that causes a computer to execute respective operations, a program that causes a computer to function as respective units, or a program that causes a computer to realize respective functions), a system, and a method for inducing functionality as such modules. Note that although terms like "store" and "record" and their equivalents may be used in the description for the sake of convenience, these terms mean that a storage device is made to store information or that control is applied to cause a storage device to store information in the case where the exemplary embodiment is a computer program. Also, while modules may be made to correspond with function on a one-to-one basis, some implementations may be configured such that one program constitutes one module, such that one program constitutes multiple modules, or conversely, such that multiple programs constitute one module. Moreover, multiple modules may be executed by one computer, but one module may also be executed by multiple computers in a distributed or parallel computing environment. Note that a single module may also contain other modules. Also, the term "connection" may be used hereinafter to denote logical connections (such as the transfer of data and referential relationships between instructions and data) in addition to physical connections. The term "predefined" refers to something being determined prior to the processing in question, and obviously denotes something that is determined before a process according to the exemplary embodiment starts, but may also denote something that is determined after a process according to the exemplary embodiment has started but before the processing in question, according to conditions or states at that time, or according to conditions or states up to that time. In the case of multiple "predefined values", the predefined values may be respectively different values, or two or more values (this obviously also includes the case of all values) which are the same. Additionally, statements to the effect of "B is conducted in the case of A" are used to denote that a determination is made regarding whether or not A holds true, and B is conducted in the case where it is determined that A holds true. However, this excludes cases where the determination of whether or not A holds true may be omitted.

Also, the terms "system" and "device" not only encompass configurations in which multiple computers, hardware, or apparatus are connected by a communication medium such as a network (including connections that support 1-to-1 communication), but also encompass configurations realized by a single computer, hardware, or device. The terms "device" and "system" are used interchangeably. Obviously, the term "system" does not include merely artificially arranged social constructs (social systems).

Also, every time a process is conducted by each module or every time multiple processes are conducted within a module, information to be processed is retrieved from a storage device, and the processing results are written back to the storage device after the processing. Consequently, description of the retrieval from a storage device before processing and the writing back to a storage device after processing may be reduced or omitted in some cases. Note that the storage device herein may include hard disks, random access memory (RAM), an auxiliary or external storage medium, a storage device accessed via a communication link, and registers, etc. inside a central processing unit (CPU).

An information processing device 100 according to the present exemplary embodiment performs a concealing process on an image, and as illustrated by the example in FIG. 1, includes a document content storage module 105, a metadata storage module 110, a masking history storage module 115, an object processing module 120, a masking manual operation module 125, a masking processing module 130, and a communication module 135. In addition, the information processing device 100 is connected to a mobile client 170 via a communication link. The information processing device 100 receives an image from the mobile client 170, and performs a concealing process on that image. Herein, a concealing process refers to replacing an area of an image whose display is undesirable with another image. The replaced image may be, for example, a solid color image such as white or black, an image indicating a general name for the concealed area (such as an illustration indicating a face), an unrelated image, or an image obtained by performing a mosaic process or the like that obscures the image in that area. The image whose display is undesirable may be, for example, a face, a store sign, a car license plate, a background, or the like whose display is undesirable in order to protect confidential information, protect personal privacy, or conceal the location where the image was captured.

The document content storage module 105 is connected to the object processing module 120. The document content storage module 105 stores an image to be subjected to a concealing process (hereinafter also designated a masking process), and an image resulting from the concealing process.

The metadata content storage module 110 is connected to the object processing module 120. The metadata storage module 110 stores object data other than the content of an image (metadata). For example, the metadata storage module 110 stores image attributes (including an access rights setting). In addition, the metadata storage module 110 may also store folder data, and may also store user/group data. For example, the metadata storage module 110 stores a photo attributes table 300, a profile information read rights table 400, a masking target table 500, and a group table 600.

Figure 3:
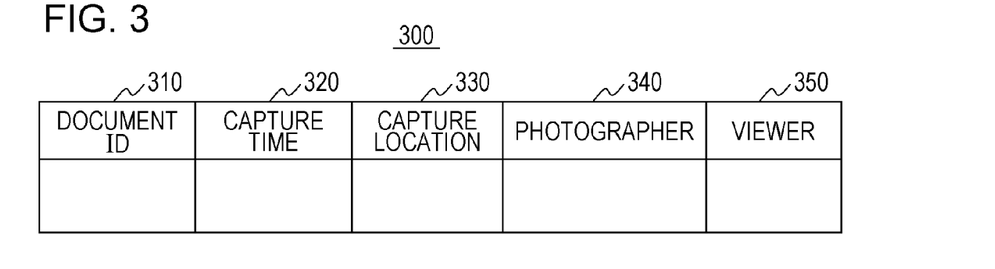
FIG. 3 is an explanatory diagram illustrating an exemplary data structure of a photo attributes table.

FIG. 3 is an explanatory diagram illustrating an exemplary data structure of the photo attributes table 300. The photo attributes table 300 includes a document ID field 310, a capture time field 320, a capture location field 330, a photographer field 340, and a viewer field 350. The document ID field 310 stores information (a document identification (ID)) for uniquely identifying an image, which is a document in the present exemplary embodiment. The capture time field 320 stores the time at which that image was captured (the time may be the year, month, day, hour, minute, second, fraction of a second, or some combination thereof). The capture location field 330 stores the location at which that image was captured. The capture location may be a place name, or information such as latitude and longitude. The photographer field 340 stores a user ID (uniquely identifying information in the present exemplary embodiment) of the user who captured that image. The viewer field 350 stores one or more users who view that image. For example, viewers are determined according to the medium in which the image is published (such as a web page available only within a company, or a web page that does not restrict viewers (a publicly available web page), for example). More specifically, one or more employees, groups, or everyone is specified.

Figure 4:
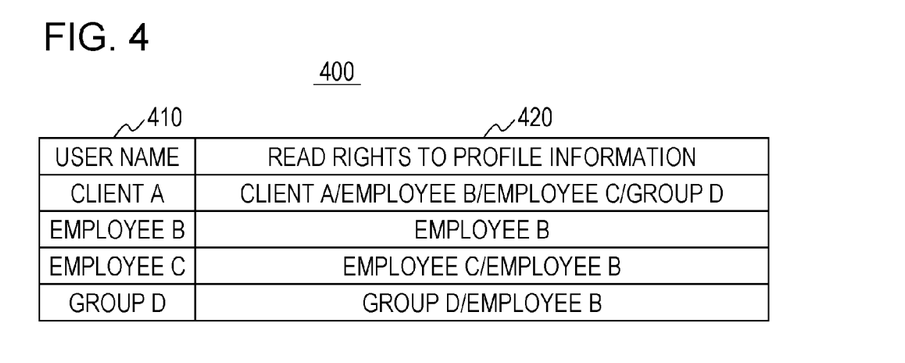
FIG. 4 is an explanatory diagram illustrating an exemplary data structure of a profile information read rights table.

FIG. 4 is an explanatory diagram illustrating an exemplary data structure of the profile information read rights table 400. The profile information read rights table 400 includes a user name field 410 and a profile information read rights field 420. The user name field 410 stores a user name (user ID). The user name also includes a group name (group ID) that includes multiple users. The profile information read rights field 420 stores read rights with respect to the profile information of that user. In the case of rights as illustrated by the example in FIG. 4, Client A does not have read rights to the profile information of Employee B, Employee C, and Group D. In such a case, if the faces of Employee B, Employee C, and members included in Group D exist within an image, and Client A is the viewer, the faces of Employee B, Employee C, and members included in Group D will be masked. Conversely, Client A, Employee B, Employee C, and Group D have read rights to Client A's profile information. Consequently, if Client A's face exists within an image, and Employee A, Employee B, Employee C, or a member included in Group D is the viewer, Client A's face is not masked.

Figure 5:
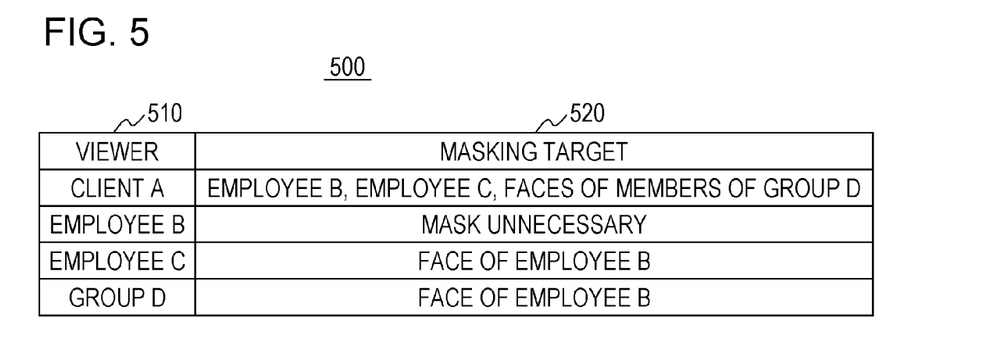
FIG. 5 is an explanatory diagram illustrating an exemplary data structure of a masking target table.

FIG. 5 is an explanatory diagram illustrating an exemplary data structure of the masking target table 500. The masking target table 500 has a data structure expressing similar information as the profile information read rights table 400, but indicates masking targets with respect to viewers. The masking target table 500 includes a viewer field 510 and a masking target field 520. The viewer field 510 stores the user ID of a viewer. The masking target field 520 stores one or more masking targets in the case of that viewer. For example, in the case in which Client A views a photo, the faces of Employee B and Employee C in that photo are masked. In the case in which Employee B views a photo, masking is not conducted, and the original photo may be viewed. In the case in which Employee C views a photo, the face of Employee B in that photo is masked.

Figure 6:
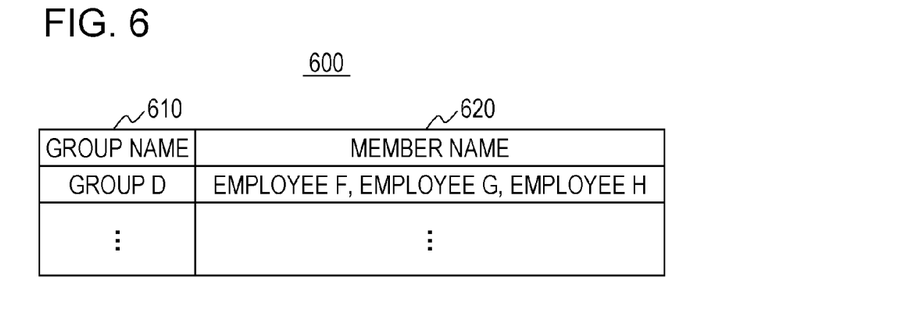
FIG. 6 is an explanatory diagram illustrating an exemplary data structure of a group table.

FIG. 6 is an explanatory diagram illustrating an exemplary data structure of the group table 600. The group table 600 is data indicating members included in a group. The group table 600 includes a group name field 610 and a member name field 620. The group name field 610 stores a group name. The member name field 620 stores one or more member names belonging to that group. The group table 600 is used in the case of extracting a user name from a group name.

The masking history storage module 115 is connected to the masking manual operation module 125 and the masking processing module 130. The masking history storage module 115 stores a history of masking applied to an image having attributes to conceal an area within that image. In other words, the masking history storage module 115 holds history information on previous maskings conducted by the image masking function of the masking manual operation module 125 according to operations by an operator. For example, the masking history storage module 115 stores a masking history table 700.

Figure 7:
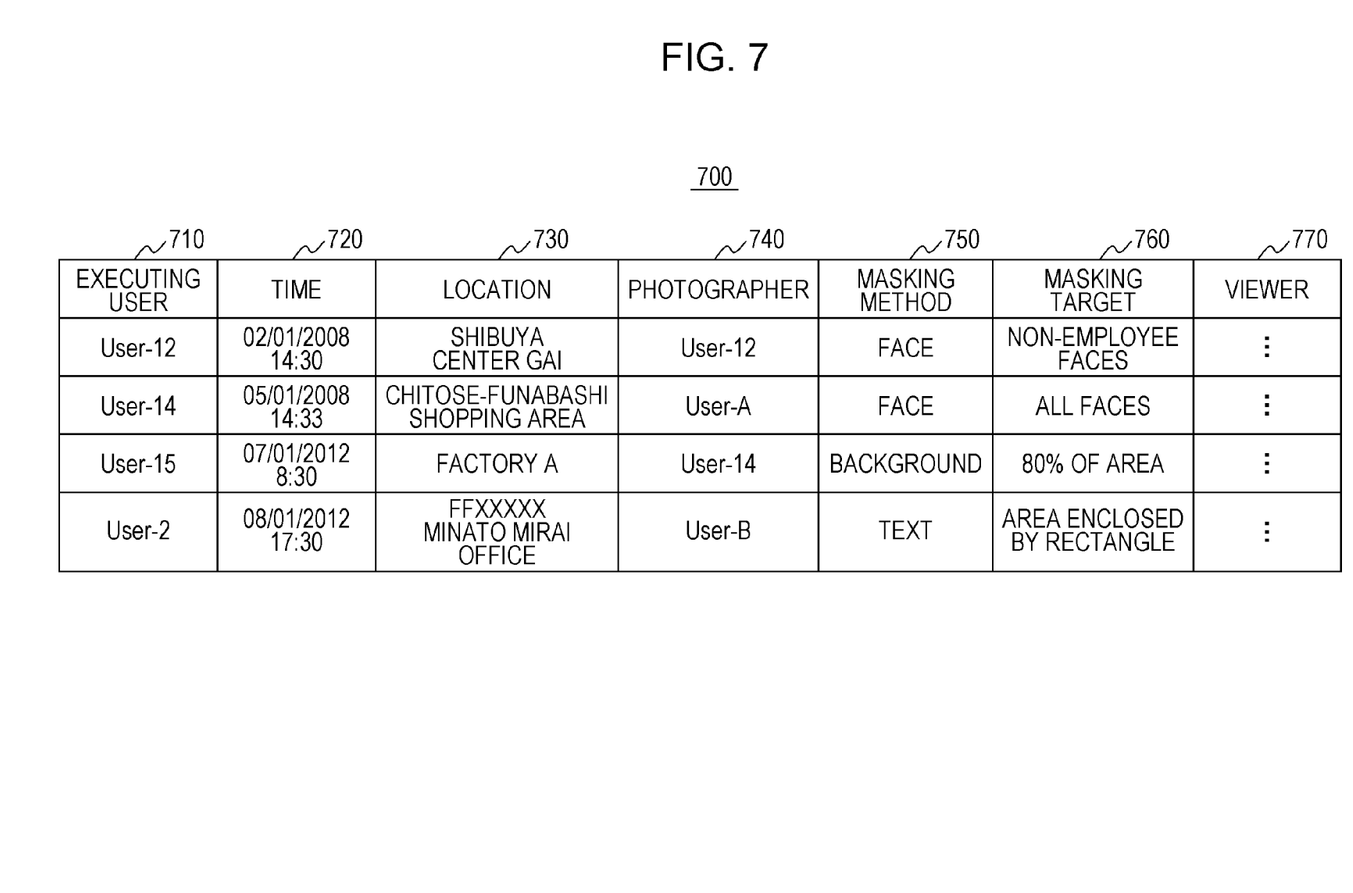
FIG. 7 is an explanatory diagram illustrating an exemplary data structure of a mask history table.

FIG. 7 is an explanatory diagram illustrating an exemplary data structure of the masking history table 700. The masking history table 700 includes an executing user field 710, a time field 720, a location field 730, a photographer field 740, a masking method field 750, a masking target field 760, and a viewer field 770. The executing user field 710 stores the user ID of a user who gives an instruction for a concealing process (the executing user). The time field 720 stores the time at which that concealing process was executed. The location field 730 stores the location at which the image subjected to the concealing process was captured. The location may be a place name, or information such as latitude and longitude. The photographer field 740 stores the user ID of the photographer of that image. The masking method field 750 stores a masking method. For example, the masking method may be a face process that masks a face area, a background process that masks a background area, or a text process that masks a text area. The masking target field 760 stores a masking target. For example, in the case of processing faces, the masking target may be "non-employee faces" or "all faces in image". In the case of processing the background, the masking target may be "80% of image area". In the case of processing text, the masking target may be "area enclosed by rectangle" or "string pattern". The string pattern may be a regular expression, and may specify a telephone number, an automobile license plate, or the like. The viewer field 770 stores the user ID of one or more viewers able to the view the resulting image from the concealing process. For example, as discussed later, when a resulting image from a concealing process is stored in a folder, the viewer field 770 stores the user ID of a viewer in the viewer field 770.

The object processing module 120 is connected to the document content storage module 105, the metadata storage module 110, the masking manual operation module 125, the masking processing module 130, and the communication module 135. The object processing module 120 conducts processes (including referencing, registering, editing, deleting, and the like) on objects (such as photos, folders, users, and groups). For example, viewers and folders are associated in advance. Specifically, access rights (particularly, read rights) are set for a folder (photos in a folder). Consequently, when a photo is stored in a folder, that photo may be viewed by a viewer associated with that folder (a user with read rights). Obviously, a user who is not associated with that folder (a user without read rights) is unable to view the photo. Consequently, in this case, storing a photo in a folder is equivalent to adding viewer attributes to the photo.

The masking manual operation module 125 is connected to the masking history storage module 115, the object processing module 120, and the communication module 135. The masking manual operation module 125 performs a concealing process on a photo according to user operations. In addition, a history of that concealing process is stored in the masking history storage module 115. The concealing process is conducted by the masking manual operation module 125 in advance before processing by the masking processing module 130.

The masking processing module 130 is connected to the masking history storage module 115 and the object processing module 120. The masking processing module 130 receives an image from the communication module 135. Subsequently, the masking processing module 130 extracts a history of processes applied to images having attributes that match the attributes of the received image from the masking history storage module 115, and on the basis of the extracted history, determines a concealment area (hereinafter also designated the mask area) within the received image. Next, the masking processing module 130 conceals the determined area within the image (hereinafter also referred to as masking).

Additionally, the masking processing module 130 may also be configured to use the viewer of the image, the photographer of the image, the capture location of the image, or a combination thereof as image attributes. Specifically, in the case of using the viewer of the image as image attributes, the masking processing module 130 compares the viewer of the image being processed to the viewer field 770 in the masking history table 700, extracts a matching history, extracts the information in the masking method field 750 and the masking target field 760 in that history, and determines a concealment area. Furthermore, the masking processing module 130 may be configured to use the profile information read rights table 400 (or the masking target table 500) to determine a concealment area corresponding to the viewer. Note that in this case, besides the information in the masking method field 750 and the masking target field 760, the information in the masking target field 520 of the masking target table 500 may be added (which increases the concealment area), or the history may be limited by the information in the masking target field 520 of the masking target table 500 that matches the information in the masking method field 750 and the masking target field 760 (which decreases the concealment area). In addition, in the case of using the photographer of the image as image attributes, the masking processing module 130 compares the photographer of the image being processed to the photographer field 740 in the masking history table 700, extracts a matching history, extracts the information in the masking method field 750 and the masking target field 760 in that history, and determines a concealment area. In addition, in the case of using the capture location of the image (for example, a place where the image was taken) as image attributes, the masking processing module 130 compares the viewer of the image being processed to the location field 730 in the masking history table 700, extracts a matching history, extracts the information in the masking method field 750 and the masking target field 760 in that history, and determines a concealment area.

Additionally, the masking processing module 130 may also be configured to determine any of an area of a face image, an area stating text, or a background area within an image, or a combination thereof, as the concealment area. The area is the same as the area in a concealing process (a concealing process stored as a history in the masking history storage module 115) conducted on an image with matching image attributes.

Additionally, in the case of multiple images with matching image attributes, the masking processing module 130 may also be configured to determine a concealment area on the basis of the histories of the multiple images. For example, in the case in which the attributes of the image being processed match multiple histories in the masking history table 700, the masking processing module 130 extracts the masking method field 750 and the masking target field 760 of the multiple histories.

Additionally, in the case of processing text, when the masking target field 760 is "string pattern", the masking processing module 130 conducts character recognition on the image being processed, and conducts a concealing process taking an area matching that string pattern (the area of a text image) as the concealment area.

The communication module 135 is connected to the object processing module 120 and the masking manual operation module 125, and to a communication module 190 of the mobile client 170 via a communication link. Note that the communication link herein may be wired, wireless, or a mixture thereof. The communication module 135 receives an image transmitted from the communication module 190 of the mobile client 170. Note that the received image may also include a viewer of the image, a photographer of the image, a capture location of the image, or a combination thereof as attributes. Note that a photographer of the image may also include the capture equipment of the image (for example, information (an identification (ID)) that uniquely identifies the mobile client 170 in the present exemplary embodiment). In addition, the viewer of the image may be determined when that image is viewed. In addition, attributes may be included in data within the image, or be provided externally rather than in data within the image.

Note that, besides the communication module 135 receiving an image via a communication link, the information processing device 100 may be configured to receive an image by, for example, reading an image with a scanner or the like, receiving an image from external equipment via a communication link such as facsimile, or reading an image stored on a device such as a hard disk (this includes devices built into a computer, as well as devices connected via a network). The image is generally a many-valued image (including a color image), but may also be a binary image. The image to receive may be a single image or multiple images.

The mobile client 170 includes a photo capture module 175, a position information acquisition module 180, a position information configuration module 185, and a communication module 190. The mobile client 170 is equipment that captures images, and may be, for example, a digital camera, a mobile phone with a built-in digital camera (including a smartphone), or the like.

The photo capture module 175 captures photos.

The position information acquisition module 180 acquires capture position information indicating the capture position of the mobile client 170. In order to detect the position when capturing, position information output by the Global Positioning System (GPS), position information of a base station used in a mobile phone network, or the like may be used, for example.

The position information configuration module 185 configures capture location information acquired by the position information acquisition module 180 in a photo (image) captured by the photo capture module 175 as an attribute. In other words, the position information configuration module 185 generates a photo whose capture location may be ascertained by analyzing data within the photo. Also, besides capture location information, a viewer of the image and a photographer of the image may also be included. In addition, any one of the above or a combination thereof may also be configured as photo attributes.

The communication module 190 is connected to the communication module 135 of the information processing device 100 via a communication link, and transmits a photo with configured attributes to the information processing device 100.

Figure 2:
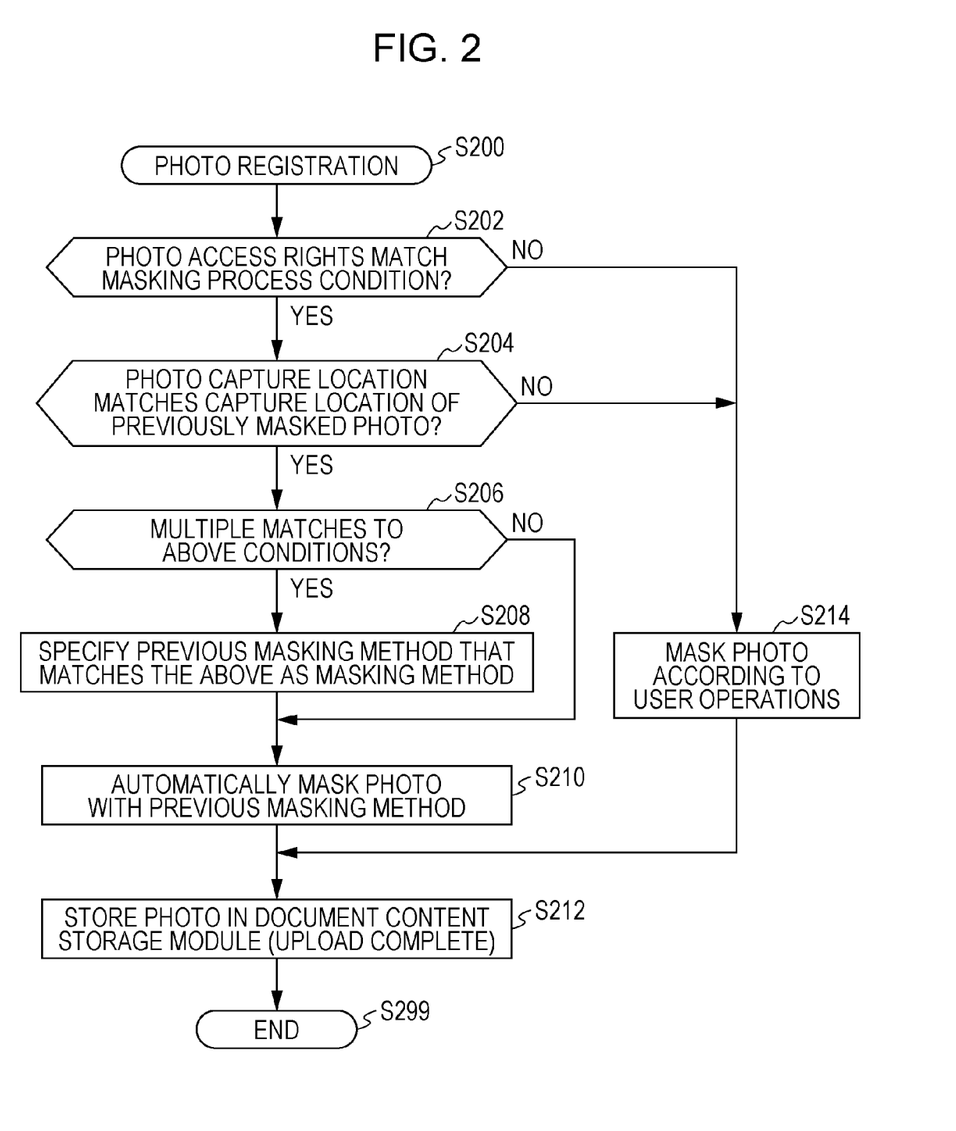
FIG. 2 is a flowchart illustrating an exemplary process according to an exemplary embodiment.

FIG. 2 is a flowchart illustrating an exemplary process according to the exemplary embodiment.

In step S202, the object processing module 120 judges whether or not the access rights to a photo match a masking process condition, and proceeds to step S204 in the case of a match, and to step S214 otherwise. For example, the masking process condition stipulates a viewer for whom a concealing process needs to be conducted. Subsequently, in the case in which a viewer and a folder are associated as discussed above, and an attempt is made to store the photo in the folder, the process in step S202 is conducted. Specifically, in the case in which Group D is stipulated as the viewer, and the viewer associated with the folder is a member belonging to Group D, the photo access rights will match the masking process condition.

In step S204, the object processing module 120 judges whether or not the capture location of the photo matches the capture location of a previously masked photo, and proceeds to step S206 in the case of a match, and to step S214 otherwise. At this point, besides using information on the capture location of the photo as the target of judgment, information on the viewer of the photo or on the photographer of the photo may also be used.

In step S206, the object processing module 120 judges whether or not multiple matches from step S204 exist, and proceeds to step S208 in the case of multiple matches, and to step S210 otherwise.

In step S208, the object processing module 120 specifies a previous masking method that matched in step S204 as the masking method.

In step S210, the masking processing module 130 masks the photo being processed using the previous masking method.

In step S212, the masking processing module 130 stores the photo in a predetermined folder in the document content storage module 105 (upload complete).

In step S214, the masking manual operation module 125 masks the photo according to a user operation. A history of the masking process at this point is stored.

Note that in the flowchart illustrated by the example in FIG. 2, it may also be configured such that only one of either step S202 or step S204 is conducted. In other words, one of either step S202 or step S204 is not conducted.

A process conducted by the present exemplary embodiment will be described using specific examples.

The information processing device 100 may be used to prevent the registration or publication of confidential information or the like in a photo due to user error.

Consider a case in which a user uses the mobile client 170 to take photos while out of the home or office, and registers the photos in the information processing device 100. In such a case, even with an information processing device 100 with image mask functions able to mask an image specified before registering a photo, when the user registers a photo, the user may forget to do the masking process or register an image with insufficient masking, such as in the case of registering a large number of images.

The information processing device 100 performs a masking process on an area of a photo whose display is undesirable when registering a photo or when displaying a photo. There is a condition on publishing to a user (including a group) with predetermined access rights information, and in the case in which the capture location information of the photo matches the capture location information of a photo masked from a previous history, a masked photo is registered or displayed on the basis of the previous history.

Figure 8A:
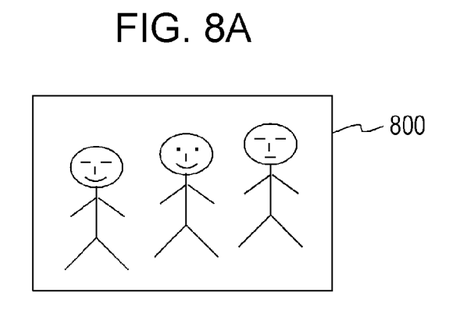
FIGS. 8A and 8B are explanatory diagrams illustrating exemplary processing according to the exemplary embodiment.
Figure 8B:
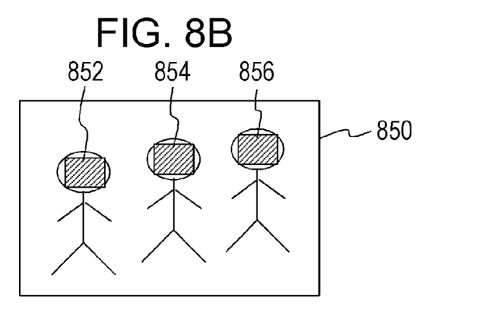

FIGS. 8A and 8B are explanatory diagrams illustrating examples of masking face areas according to the present exemplary embodiment.

The mobile client 170 transmits a photographic image 800 to the information processing device 100. The photographic image 800 depicts three persons, as illustrated by the example in FIG. 8A. The masking processing module 130 extracts a mask area 852, a mask area 854, and a mask area 856, which are the areas of the three persons' faces (see the example in FIG. 8B). At this point, facial recognition technology may be used as the method of specifying a mask area. Subsequently, a history in the masking history storage module 115 that matches an attribute of the photographic image 800 (for example, the capture location) is extracted, and the same masking process as that history is performed. Note that in the case of masking all faces, the masking process may mask all mask areas. Also, in the case of masking a specified user, facial recognition technology is used to specify who the three persons are. Subsequently, the face area of a user matching the history is masked. A masked image 850 is then registered in the document content storage module 105 or displayed.

Figure 9A:
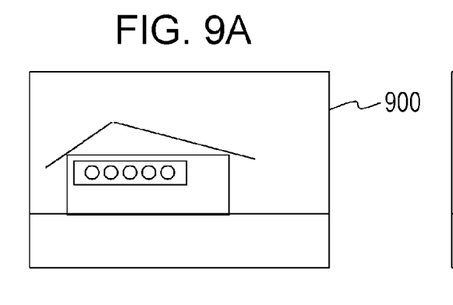
FIGS. 9A and 9B are explanatory diagrams illustrating exemplary processing according to the exemplary embodiment.
Figure 9B:
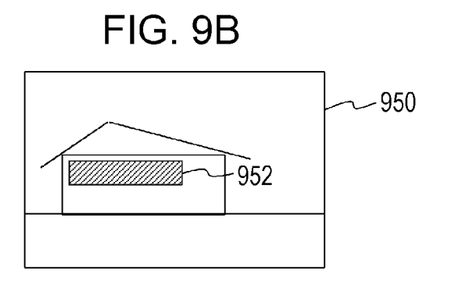

FIGS. 9A and 9B are explanatory diagrams illustrating examples of masking a text area according to the present exemplary embodiment.

The mobile client 170 transmits a photographic image 900 to the information processing device 100. The photographic image 900 depicts the sign of a store, as illustrated by the example in FIG. 9A. The masking processing module 130 extracts a mask area 952, which is a text area (see the example in FIG. 9B). At this point, character recognition technology may be used as the method of specifying a mask area. Also, in the case of ascertaining in advance that there is limited text (such as the license plate of an automobile, for example) within the capture image, pattern matching technology may also be used. Subsequently, a history in the masking history storage module 115 that matches an attribute of the photographic image 900 (for example, the capture location) is extracted, and the same masking process as that history is performed. Note that in the case of masking all text, the masking process may mask all mask areas. Also, in the case of masking a specified string pattern as the masking process, the text area of a string resulting from character recognition that matches the string pattern is specified. Subsequently, the text area matching the history is masked. A masked image 950 is then registered in the document content storage module 105 or displayed.

Figure 10A:
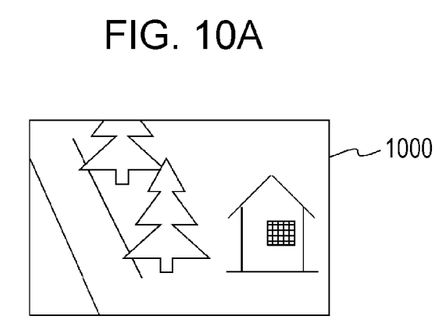
FIGS. 10A and 10B are explanatory diagrams illustrating exemplary processing according to the exemplary embodiment.
Figure 10B:
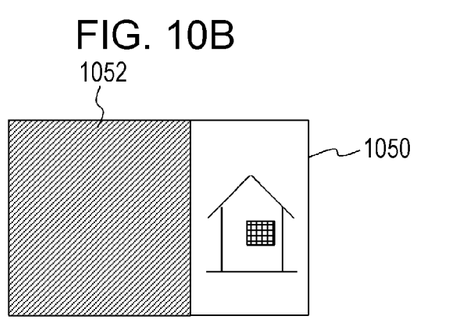

FIGS. 10A and 10B are explanatory diagrams illustrating examples of masking a background area according to the present exemplary embodiment.

The mobile client 170 transmits a photographic image 1000 to the information processing device 100. The photographic image 1000 depicts a house and the background thereof, as illustrated by the example in FIG. 10A. The masking processing module 130 uses image recognition technology that recognizes the house. Subsequently, the masking processing module 130 extracts the background area other than the house as a mask area 1052 (see the example in FIG. 10B). Also, the same area as a previous history may be treated as the background area. In this case, the user is able to adjust the mask area. Subsequently, a history in the masking history storage module 115 that matches an attribute of the photographic image 1000 (for example, the capture location) is extracted, and the same masking process as that history is performed. A masked image 1050 is then registered in the document content storage module 105 or displayed.

Figures 11A, 11B:
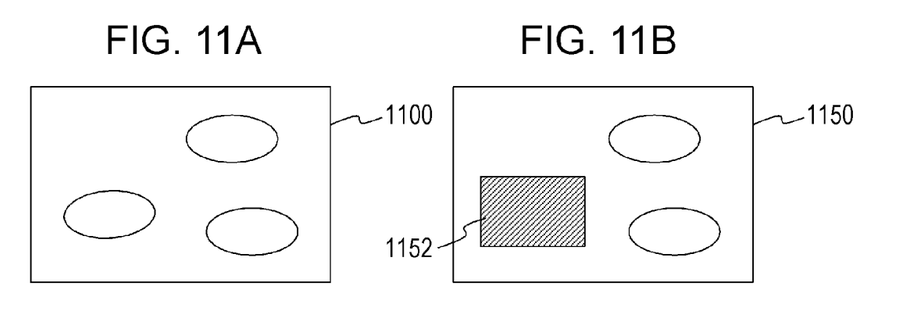
FIGS. 11A and 11B are explanatory diagrams illustrating exemplary processing according to the exemplary embodiment.

FIGS. 11A and 11B are explanatory diagrams illustrating examples of masking a specific area according to the present exemplary embodiment.

The mobile client 170 transmits a photographic image 1100 to the information processing device 100. The photographic image 1100 depicts a given object (such as candy), as illustrated by the example in FIG. 11A. The masking processing module 130 uses object recognition technology that recognizes the object. Subsequently, the masking processing module 130 extracts the area of the given object as a mask area 1152 (see the example in FIG. 11B). Also, the same area as a previous history may be treated as the mask area. In this case, the user is able to adjust the mask area. Subsequently, a history in the masking history storage module 115 that matches an attribute of the photographic image 1100 (for example, the capture location) is extracted, and the same masking process as that history is performed. A masked image 1150 is then registered in the document content storage module 105 or displayed.

Figure 12:
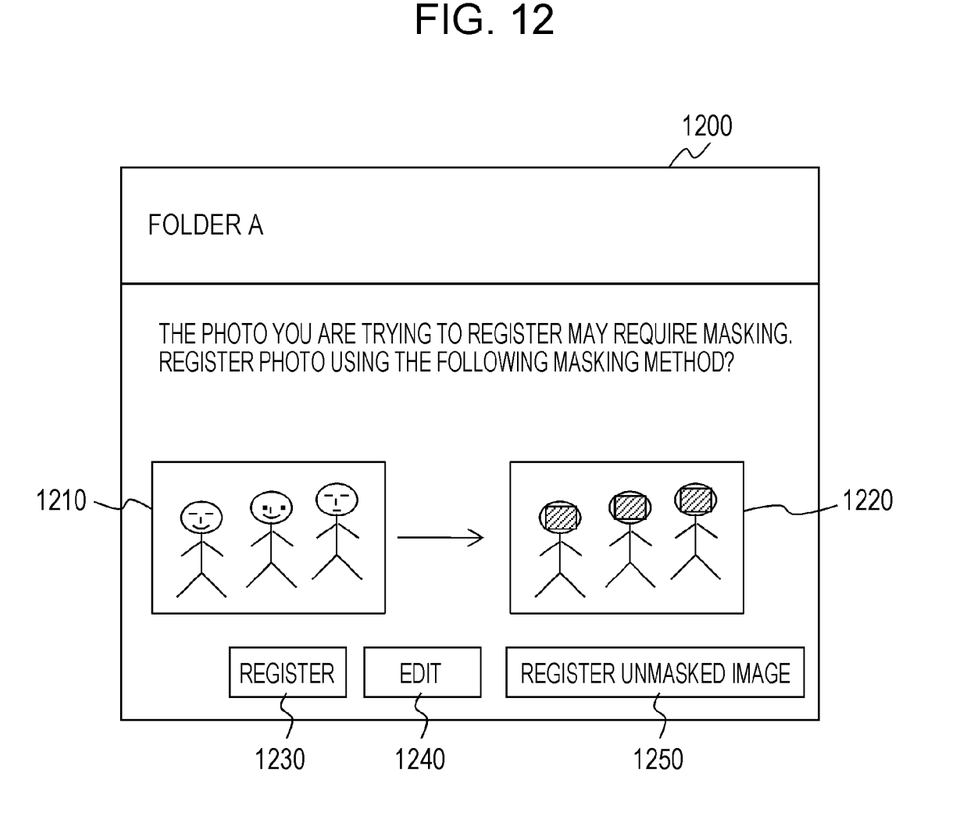
FIG. 12 is an explanatory diagram illustrating exemplary processing according to the exemplary embodiment.

FIG. 12 is an explanatory diagram illustrating exemplary processing according to the exemplary embodiment.

In the case of attempting to register an original photographic image 1210 in a folder A, a pre-masking confirmation screen 1200 is displayed, as illustrated by the example in FIG. 12. For example, images viewable by Client A are stored in the folder A. Consequently, in accordance with the profile information read rights table 400 (or the masking target table 500) discussed earlier, there is generated a masked image 1220 in which the face areas of Employee B, Employee C, and members belonging to Group D within the original photographic image 1210 are masked.

Displayed on the pre-masking confirmation screen 1200 is a masking confirmation prompt (for example, "The photo you are trying to register may require masking. Register photo using the following masking method?"), together with the original photographic image 1210 and the corresponding masked image 1220, as well as a Register button 1230, an Edit button 1240, and a Register unmasked image button 1250. In the case of selecting the Register button 1230, the masked image 1220 is registered in the folder A of the document content storage module 105. In the case of selecting the Edit button 1240, the masking processing module 130 is made to conduct a process of presenting an editable display of the masked image 1220. In addition, a history of the masking process at this point is stored in the masking history storage module 115, and the masked image is registered in the folder A of the document content storage module 105. In the case of selecting the Register unmasked image button 1250, the original photographic image 1210 is registered in the folder A of the document content storage module 105.

A specific usage example is given below.

At a real estate company, in order to publish the latest information related to a property on a website, a real estate agent captures updated photos of the premises, and periodically uploads photos of the building and surroundings to the information processing device 100. Although the faces of persons depicted in a photo of a shopping area are masked to protect privacy, employees of the real estate company are not masked. The faces of persons in the shopping area are masked on the basis of a history of the previous masking process position and masking method.

This example uses the example of Employee B (a superior of Employee C) instructing Employee C to acquire and upload a photo. The masking process is conducted on the basis of the previous history even if Employee C is transferred, and thus it is still possible to conduct masking process similar to the previous history, even in the case of a succession that is not strictly direct.

Avoiding Incomplete Checking by Employee C Before Registration (No Check by Employee B)

(1) Employee B configures the information processing device 100 with an instruction indicating, "Among photos registered in a specific folder and below, if the photo is unmasked, automatically generate a masked photo, irrespective of whether or not a photo taken previously at the same place was masked". (2) Employee C registers a photo. (3) The information processing device 100 masks the registered photo on the basis of a history. (4) Employee C decides whether to present a display of either the original image of the registered photo or the masked photo to Client A (see the example in FIG. 12). (5) In the case in which Employee C selects the masked photo, Client A is only able to refer to the masked photo.

Avoiding Missed Checks by Employee B (1) Employee B configures the information processing device 100 with an instruction indicating, "Among photos registered in a specific folder and below, if the photo is unmasked, automatically generate a masked photo, irrespective of whether or not a photo taken previously at the same place was masked". (2) Employee C registers a photo. (3) The information processing device 100 masks the registered photo on the basis of a history. (4) Employee B decides whether to present a display of either the original image of the registered photo or the masked photo to Client A (see the example in FIG. 12). (5) In the case in which Employee B selects the masked photo, Client A is only able to refer to the masked photo.

Employee B Collectively Checking Missed Masking Later (1) Employee C registers a photo. Note that although the information processing device 100 has a masking function, the implementation is arbitrary, and thus in some cases a masked photo may be registered, whereas in other cases an unmasked photo may be registered. (2) Employee B gives an instruction indicating, "If the photo is unmasked, automatically generate a masked photo, irrespective of whether or not a photo taken previously at the same place was masked". (3) The information processing device 100 masks the registered photo on the basis of a history. (4) Employee B decides whether to present a display of either the original image of the registered photo or the masked photo to Client A (see the example in FIG. 12). (5) In the case in which Employee B selects the masked photo, Client A is only able to refer to the masked photo.

Preventing Unauthorized Modification of Access Rights by Another Party (1) Employee C registers a photo. Note that although the information processing device 100 has a masking function, the implementation is arbitrary, and thus in some cases a masked photo may be registered, whereas in other cases an unmasked photo may be registered. (2) Another user performs an operation to reveal access rights. Note that this operation is not applied immediately. (3) The information processing device 100 automatically masks the registered photo on the basis of a history. (4) Employee B decides whether to present a display of either the original image of the registered photo or the masked photo to Client A (see the example in FIG. 12). Subsequently, after the above decision, the change in access rights is applied. (5) In the case in which Employee B selects the masked photo, Client A is only able to refer to the masked photo.

The Case of Someone Other than Client a Wanting to View an Unmasked Photo (1) Employee B configures the information processing device 100 with an instruction indicating, "Among photos registered in a specific folder and below, if the photo is unmasked, automatically generate a masked photo, irrespective of whether or not a photo taken previously at the same place was masked". (2) Employee C registers a photo. (3) The information processing device 100 masks the registered photo on the basis of a history. The information processing device 100 stores both the original image and the masked photo as a single document. (4) Employee C decides whether to present a display of either the original image of the registered photo or the masked photo to Client A (see the example in FIG. 12). (5) In the case in which Employee C selects the masked photo, Client A is only able to refer to the masked photo, but in the case of the same document being accessed by an employee who is not Client A, the original photo is displayed.

Filtering Previous History (1) In the case in which different work is performed per group, there is a possibility that an employee in another group may mask a photo as part of different work.

In such a case, face areas may be automatically masked, even though masking face areas was not actually required for that photo. (2) Consequently, the previous history may be limited to processing performed by a specific group.

For example, only the history of the group to which Employee C belongs is extracted. Subsequently, in this case, a photo that was masked as part of different work by a separate employee is not masked. Alternatively, it may be selectable whether or not to apply masking by another group.

Precision of Face Area Masking Method

The face area masking method may utilize face image recognition technology.

As a method of further raising precision, face image recognition technology able to specify persons is used together with access rights.

For example, in the case in which a face area contains the image of an employee who is not to be masked rather than a member of the general public who is to be masked, masking is not conducted, irrespective of the capture location. Whether or not an image is of an employee may be determined by storing employee faces in advance, and cross-referencing images. In addition, in the case in which it is already possible to identify an employee who is not to be disclosed to Client A (such as a dignitary or VIP), it may be configured such that masking is definitely performed.

Method of Specifying Target to Keep Private

The above example describes a method of manually specifying targets to keep private with a general client group and a group such as an employee group of a company A. However, in order to achieve further simplification, when processing a face, the information processing device 100 may also utilize access rights with respect to persons. For example, in one case, the faces of Employee B and Employee C may not be disclosed to Client A in order to keep the faces of the site operators private. In such a case, on the information processing device 100 it is typical to restrict a general client user from viewing the user information of Employee B and Employee C. In the case where a person depicted in a photo is identified by face image recognition, if a viewer is determined not to have an access right to that person, the face of the person is set as a masking target. Consequently, a viewer without rights becomes unable to view a facial photo of a person to be kept private when viewing the photo.

Processing Text within a Photo

Masking is performed in the case in which a character recognition process is performed on a photo, and an extracted string pattern is close to a previously extracted string pattern. For example, in the case of processing a license plate such as "A 46-49", the processed string is treated as a regular expression, and in the case of a matching pattern, that pattern is set as a target of the masking process. In other words, the string pattern is learned. Also, a method may also be adopted in which such a license plate pattern is registered in the information processing device 100 in advance, and the masking process is applied even without a history.

Judging Whether or not Capture Location Matches

Although the capture location of a photo is acquired by a position detection technology such as GPS, the question of whether or not the capture location matches may be judged using a range, such as within a radius of X km.

Masking Processes Other than Face Mask, Text Mask

Other masking processes include background masking and masking a specific object. The masking process in this case may mask (or not mask) an arbitrary location according to a user operation. Additionally, the history of that mask area is specified from previous histories using a condition such as "photo with closest capture location to photo being processed" or "compare photo being processed to original photo before masking, and find similar photo". Subsequently, the mask area from that history (or the area that was not masked) may be displayed, and the user may be able to adjust that area. As a result, the number of steps taken by the user to edit the area to mask (or the area to not mask) is reduced.

Judging when Multiple Processing Methods Exist in Previous History

In the case in which multiple processing methods exist in the previous histories for photos captured at the same location, any of the following processes may be conducted.

1. Perform all masking processes.
2. Perform only the most-used masking process.
3. Prioritize history of user belonging to the same group.

For example, in the case of conducting the above process 1, in the case in which, for a photo of a shopping area, the histories include a history of masking the face areas of people and a history of masking the license plate areas of cars, and in the case in which the photo to be uploaded depicts both cars and people, both the people and the cars are masked.

Method of Storing Original Image and Masked Image

Any of the following two processes may be conducted.

1. Store both original image and masked image.
2. Store original image, and conduct masking process every time photo is displayed in a case where a user is only allowed to view a masked photo.

The above process 1 creates larger files stored by the information processing device 100, while the process 2 takes more time to display the masked image. Either process may be selected according to the end user environment.

Figure 13:
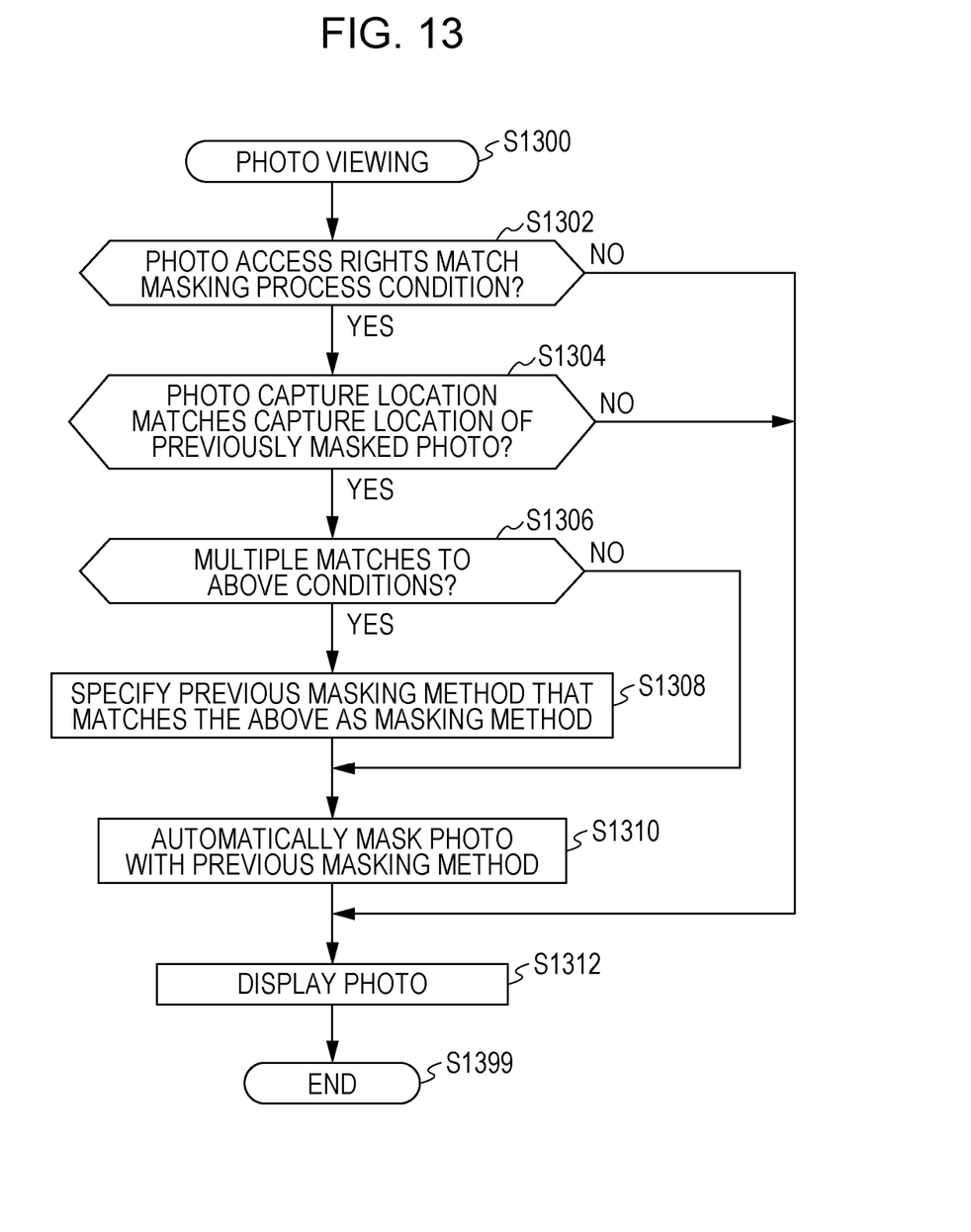
FIG. 13 is a flowchart illustrating an exemplary process according to the exemplary embodiment.

FIG. 13 is a flowchart illustrating an exemplary process according to the present exemplary embodiment. Whereas the flowchart exemplified in FIG. 2 performs the masking process during registration, the flowchart exemplified in FIG. 13 performs the masking process when displaying a photo.

The processing from step S1302 to step S1310 is similar to the processing from step S202 to step S210 in the flowchart exemplified in FIG. 2. In step S1312, a photo is displayed. Note that the processing in step S214 is not included. In other words, in the case of "No" in the judgment processes of step S1302 and step S1304, the original photo not subjected to the masking process is displayed.

An exemplary hardware configuration of an information processing device (besides the information processing device 100, this may also include the mobile client 170) according to the present exemplary embodiment will now be described with reference to FIG. 14. The configuration illustrated in FIG. 14 may be realized by a personal computer (PC), for example, and illustrates an exemplary hardware configuration equipped with a data reading unit 1417 such as a scanner, and a data output unit 1418 such as a printer.

The central processing unit (CPU) 1401 is a controller that executes processing according to a computer program that states execution sequences for the various modules described in the exemplary embodiment discussed in the foregoing, or in other words, for respective modules such as the object processing module 120, the masking manual operation module 125, the masking processing module 130, the communication module 135, the photo capture module 175, the position information acquisition module 180, the position information configuration module 185, and the communication module 190.

The read-only memory (ROM) 1402 stores information such as programs and computational parameters used by the CPU 1401. The random access memory (RAM) 1403 stores information such as programs used during execution by the CPU 1401, and parameters that change as appropriate during such execution. These memory units are connected to each other by a host bus 1404 realized by a CPU bus, for example.

The host bus 1404 is connected to the external bus 1406 such as a Peripheral Component Interconnect/Interface (PCI) bus via the bridge 1405.

The keyboard 1408 and the mouse or other pointing device 1409 are input devices operated by a user. The display 1410 may be a liquid crystal display (LCD) or cathode ray tube (CRT) device, and displays various information as text and image information.

The hard disk drive (HDD) 1411 houses and drives a hard disk, causing programs executed by the CPU 1401 and information to be recorded thereto or retrieved therefrom. The hard disk stores information such as photos (original photos, masked photos), histories of previous masking processes conducted according to user operations (the masking history table 700), the photo attributes table 300, the profile information read rights table 400, the masking target table 500, and the group table 600. Additionally, various other computer programs such as various data processing programs are stored therein.

The drive 1412 reads out data or programs recorded onto a removable recording medium 1413 such as an inserted magnetic disk, optical disc, magneto-optical disc, or semiconductor memory, and supplies the data or programs to the RAM 1403 connected via the interface 1407, the external bus 1406, the bridge 1405, and the host bus 1404. The removable recording medium 1413 is usable as a data recording area similar to a hard disk.

The connection port 1414 is a port that connects to externally connected equipment 1415, and has a USB, IEEE 1394, or similar receptacle. The connection port 1414 is connected to the CPU 1401 via the interface 1407 as well as the external bus 1406, the bridge 1405, and the host bus 1404. The communication unit 1416 is connected to a communication line and executes data communication processing with external equipment. The data reading unit 1417 may be a scanner, for example, and executes document scanning processing. The data output unit 1418 may be a printer, for example, and executes document data output processing.

Figure 14:
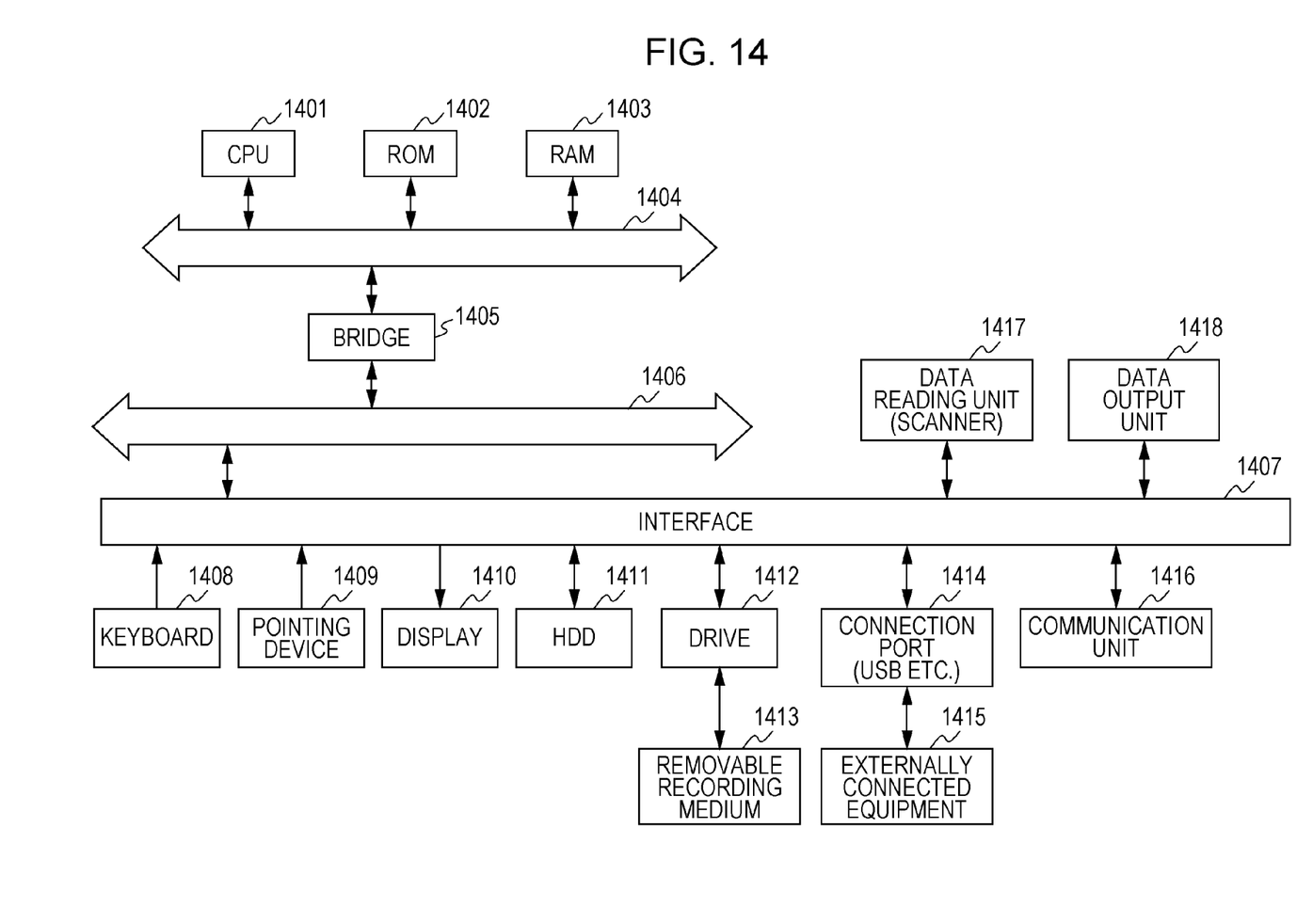
FIG. 14 is a block diagram illustrating an exemplary hardware configuration of a computer that realizes an exemplary embodiment.

Note that the hardware configuration of an information processing device illustrated in FIG. 14 illustrates a single exemplary configuration, and that the exemplary embodiment is not limited to the configuration illustrated in FIG. 14 insofar as the configuration still enables execution of the modules described in the exemplary embodiment. For example, some modules may also be realized with special-purpose hardware (such as an application-specific integrated circuit (ASIC), for example), and some modules may be configured to reside within an external system and be connected via a communication link. Furthermore, it may also be configured such that multiple instances of the system illustrated in FIG. 14 are connected to each other by a communication link and operate in conjunction with each other. Additionally, the present exemplary embodiment may also be built into a device such as a photocopier, fax machine, scanner, printer, or multi-function device (i.e., an image processing device having two or more from among scanning, printing, copying, and faxing functions).

Note that the described program may be provided stored in a recording medium, but the program may also be provided via a communication medium. In this case, a computer-readable recording medium storing a program, for example, may also be taken to be an exemplary embodiment of the present invention with respect to the described program.

A "computer-readable recording medium storing a program" refers to a computer-readable recording medium upon which a program is recorded, and which is used in order to install, execute, and distribute the program, for example.

Potential examples of a recording medium include a Digital Versatile Disc (DVD), encompassing formats such as DVD-R, DVD-RW, and DVD-RAM defined by the DVD Forum and formats such as DVD+R and DVD+RW defined by DVD+RW Alliance, a compact disc (CD), encompassing formats such as read-only memory (CD-ROM), CD Recordable (CD-R), and CD Rewritable (CD-RW), a Blu-ray Disc (registered trademark), a magneto-optical (MO) disc, a flexible disk (FD), magnetic tape, a hard disk, read-only memory (ROM), electrically erasable and programmable read-only memory (EEPROM (registered trademark)), flash memory, random access memory (RAM), and a Secure Digital (SD) memory card.

In addition, all or part of the above program may also be recorded to the recording medium and saved or distributed, for example. Also, all or part of the above program may be communicated by being transmitted using a transmission medium such as a wired or wireless communication network used in a local area network (LAN), a metropolitan area network (MAN), a wide area network (WAN), an internet, an intranet, an extranet, or some combination thereof, or alternatively, by being impressed onto a carrier wave and propagated.

Furthermore, the above program may be part of another program, and may also be recorded to a recording medium together with other separate programs. The above program may also be recorded in a split manner across multiple recording media. The above program may also be recorded in a compressed, encrypted, or any other recoverable form.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
    a memory configured to store a history of performing, on an image having an attribute, a process that conceals an area within the image; and
    at least one hardware processor configured to implement:
        a receiving unit that receives a first image;
        a decision unit that extracts from the memory a history of a process performed on a second image, which is different from the first image, having an attribute that matches an attribute of the received first image, and on the basis of the extracted history of a process, decides a concealment area within the received first image; and
        a concealment unit that conceals the concealment area within the first image decided by the decision unit.

2. The information processing device according to claim 1, wherein
    the decision unit uses, as the attribute of the first image, information on a user who has an access right of the first image, a photographer of the image, a location where the first image has been taken, or a combination thereof.

3. The information processing device according to claim 2, wherein
    the decision unit decides any of an area of a face image, an area stating text, or a background area within an image, or a combination thereof, as the concealment area.

4. The information processing device according to claim 3, wherein
    in a case where a plurality of images has an attribute that matches the attribute of the received first image, the decision unit decides the concealment area on the basis of histories of the plurality of images.

5. The information processing device according to claim 2, wherein
    in a case where a plurality of images has an attribute that matches the attribute of the received first image, the decision unit decides the concealment area on the basis of histories of the plurality of images.

6. The information processing device according to claim 1, wherein
    the decision unit decides any of an area of a face image, an area stating text, or a background area within an image, or a combination thereof, as the concealment area.

7. The information processing device according to claim 6, wherein
    in a case where a plurality of images has an attribute that matches the attribute of the received first image, the decision unit decides the concealment area on the basis of histories of the plurality of images.

8. The information processing device according to claim 1, wherein
    in a case where a plurality of images has an attribute that matches the attribute of the received first image, the decision unit decides the concealment area on the basis of histories of the plurality of images.

9. The information processing device according to claim 1, wherein the stored history is a history of a past performing, in response to a past request by a user to access the image, the process that conceals the area within the image having the attribute.

10. An information processing method comprising:
    storing, in a memory, a history of performing, on an image having an attribute, a process that conceals an area within the image;
    receiving, by at least one hardware processor, a first image;
    extracting, by the at least one hardware processor from the memory, a stored history of a process performed on a second image, which is different from the first image, having an attribute that matches an attribute of the received first image, and on the basis of the extracted history of a process, deciding a concealment area within the received first image; and
    concealing, by the at least one hardware processor, the decided concealment area within the first image.

11. A non-transitory computer readable medium storing a program causing a computer to execute a process for processing information, the process comprising:
    storing a history of performing, on an image having an attribute, a process that conceals an area within the image;

receiving a first image;

extracting a stored history of a process performed on a second image, which is different from the first image, having an attribute that matches an attribute of the received first image, and on the basis of the extracted history of a process, deciding a concealment area within the received first image; and concealing the decided concealment area within the first image.

* * * * *